(12) United States Patent
Lin

(10) Patent No.: US 7,907,119 B2
(45) Date of Patent: Mar. 15, 2011

(54) THEME CHANGEABLE MOUSE FOR AUTOMATICALLY MATCHING NETWORK COMMUNITIES

(75) Inventor: Hao Fong Lin, Taipei (TW)

(73) Assignee: Big Rice Information Co., Ltd., Taipei (TW)

( * ) Notice: Subject to any disclaimer, the term of this patent is extended or adjusted under 35 U.S.C. 154(b) by 0 days.

(21) Appl. No.: 12/003,227

(22) Filed: Dec. 20, 2007

(65) Prior Publication Data

US 2010/0214217 A1  Aug. 26, 2010

(51) Int. Cl.
  *G06F 3/033*  (2006.01)
(52) U.S. Cl. .................. 345/163; 345/157; 726/3; 726/4
(58) Field of Classification Search .................. 345/163, 345/157; 726/3, 4
  See application file for complete search history.

(56) References Cited

U.S. PATENT DOCUMENTS

| | | | | |
|---|---|---|---|---|
| 6,392,671 | B1 * | 5/2002 | Glaser | 715/765 |
| 6,778,166 | B2 * | 8/2004 | Lin | 345/161 |
| 2003/0076357 | A1 * | 4/2003 | Glaser | 345/765 |
| 2004/0189604 | A1 * | 9/2004 | Lee | 345/163 |
| 2005/0253811 | A1 * | 11/2005 | Hiromori | 345/163 |
| 2005/0280633 | A1 * | 12/2005 | Glaser | 345/163 |
| 2008/0007525 | A1 * | 1/2008 | Sim | 345/163 |
| 2008/0284732 | A1 * | 11/2008 | Rovery et al. | 345/163 |

* cited by examiner

*Primary Examiner* — Alexander Eisen
*Assistant Examiner* — Priyank Shah
(74) *Attorney, Agent, or Firm* — Jackson IPG PLLC; Demian K. Jackson

(57) ABSTRACT

A theme changeable mouse for automatically matching network communities is provided and can automatically match and link users of individually customized theme website communities by built-in IDs (identifications). The mouse includes a theme cover and a mouse base. The theme cover can be optionally matched and changed, while each of the theme cover has the IDs therein. A recognition processing unit of a control circuit firmware on a printed circuit board in the mouse base is used to execute a recognition process, so that the user can automatically log into a specific website for providing advanced information service if the user is matched.

6 Claims, 10 Drawing Sheets

THEME CHANGEABLE MOUSE FOR AUTOMATICALLY MATCHING NETWORK COMMUNITIES

FIELD OF THE INVENTION

The present invention relates to a mouse, and more particularly to a theme changeable mouse for automatically matching network communities, which can automatically match and link users of individually customized theme website communities by built-in IDs (identifications), wherein a theme cover of the mouse can be optionally matched and changed, and a recognition processing unit of a control circuit firmware on a printed circuit board in a mouse base is used to execute a recognition process, so as to automatically log in a specific website or an advanced service.

BACKGROUND OF THE INVENTION

Nowadays, computers are developed and are used at the workplaces and houses of everyone, even individuals, so as to be an essential of modern life.

In the boundless Internet, computers shorten spatial distance between one person and others, while building the simplest linking bridge of humans. And, an ideal of the global village can be carried out in the virtual world of the Internet. Now, the Internet is developed from the initial Bulletin Board System (i.e. BBS) to the Web (or World Wide Web, i.e. WWW), wherein the Web is derived into Web 1.0, Web 2.0 according definitions, and even the current developing Web 3.0.

No matter how to classify and define various Internet service modes, the Internet is basically used to satisfy the needs of users, and is advanced according to human desire. Thus, the Web 2.0, an individualized and shared Internet service platform, is also developed toward main network values, such as blog, network photo album, community organization, resource sharing, and other services. However, there are still huge business opportunities of boundless market economic scale hidden under known resources of the Internet, just like oil fields in the oceanic trench, but there is no any suitable tool to mine.

According to statistical data of the Internet Data Center (IDC), the amount of worldwide computers including desktop (DT) computers and notebook (NB) computers have grown from 39 million in 2002 to 69 million in 2005. Meanwhile, the market needs of main peripheral input interface devices of the computers, such as mouse, have incredibly grown from 240 million in 2004 to 300 million in 2006. It means that, the mouse and other input interfaces have also become one of essentials of daily life. However, due to product popularization and serious competition of market, the gross margin of mouse products is increasingly lowered.

The present invention can convert an operation environment of a general computer application system from a current traditional input interface into a next generation human-machine interface, while organizing and integrating the Internet world to commonly constitute an operation interface of a user end, a human sense emotion aspect, and the Internet content, so as to have an interlinked system framework organization.

Initially, there is no feeling or emotion between humans and machines in the operation of computers. Traditionally, users only offer needs and obtain a feedback via input devices (such as mouse, keyboard, and etc.), but the input devices are only usable tools for human. Presently, with the advance of the Internet and the worldwide popularization of networks, there is no gap or distance in communication between humans and transmissions of information, and the emotional aspect of humans is extended via the computers.

The key point of the present invention is to return the emotional feeling back to a most basic computer unit of personal operation, which can provide a sense of feeling to an operation interface of a user end (such as a mouse). The content of the theme can be selected from a theme-object directed product with a special emotion meaning of a user, a personal favorite or individualized theme-object directed product, and even a theme-object directed product of DIY (do it yourself) customized style. Users can combine with transnational group fans having common favorites into a colony group via the theme input devices through the Internet.

Nowadays, mouse and other computer input devices are not only used to satisfy operational needs of traditional function, but also should become a technological product for entering next generation evolution, increasing life quality, individualizing, combining with user's emotion, and increasing funny experience, while actively linking interest-related users to each other via the network.

During the growth of human, they may have different favorites, interests, experiences, travels, and memories in individual life growth. Thus, it is important for the present invention to improve how to actively link worldwide people with common hobbies, interests, and experiences to each other, in order to commonly share their experiences and practices, and to form a global village by a community having different theme group colonies.

The present invention provides a theme mouse 3 capable of changing themes, wherein a theme cover 2 is connected to a mouse base, so as to provide a theme mouse with a visional expression. The content of the theme cover 2 can be varied according to market needs, such as fashion portrait themes, cartoon puppets, tour spots, advertisements, movie scenes, enterprise identification content, and etc. Furthermore, the theme cover 2 is provided with a sub-ID corresponding to a classification number of the group for being used as one of important factors which are applied to a web server 7 for registering, logging, and matching groups.

In a preferred embodiment of the present invention, a substantial portion of a mouse and a network service space are combined with each other to expand limitless values thereof. When the theme mouse 3 is installed on a terminal computer via a network linkage, the theme mouse 3 can automatically log in a network service space of an individual theme content provided by a customized web server 7. Meanwhile, the web server 7 can automatically determine if collecting the theme mouse 3 to a fans group of the same theme, and actively match a group of theme mice 3 having common favorites, interests, and similar content with each other.

Traditionally, if a user wants to apply for a cyberspace service, the user must obtain an application or registration for using the network service by finishing complicated steps as follows: linking to the Internet; searching a suitable blog network platform; inputting personal information; registering; obtaining a password; verifying; and logging in. Moreover, if wanting to log in and use a registered network service, the user still needs to finish complicated steps as follows: linking to the Internet; inputting a web address; logging in by an ID and a password; verifying; and starting the network service.

The present invention uses a seamless operation method to directly verify a built-in ID of the theme mouse 3 and automatically register to start or log in an individually customized web server 7, wherein each of the theme mice 3 can obtain a network service space corresponding to the theme content. By using an extending hot key of the theme mouse 3, a cyberspace service can be immediately started. As a result, a next generation input interface, i.e. mouse, will further provide an extended value of linking to the network service.

By using the web server 7 in the present invention, worldwide people having common favorites or interests can automatically log-in via the theme mouse 3 through a verifying mechanism of the theme content of the web server 7, so as to be actively matched and collected to a common fans group. Thus, the worldwide people linking to the Internet can have an opportunity to communicate and share with each other, manage their own cyberspace, and develop their own community.

By using the theme mouse 3, a user can have a web service of an individual theme space which provides a customized network service space of individual style corresponding to the content of the theme mouse 3. Meanwhile, by using a technology of seamless background operation, the user can optionally enter or exit his/her customized network service without manually inputting any web address, ID, and password to log in it.

The theme mouse 3 is used as a recognition device of a customized network service, so that general (infrequent) network users can have an individual network service space (such as a blog) without any restriction.

Everyone has diverse interests and diverse hobbies. Thus, by purchasing and collecting various theme covers 2, the user can obtain spaces and usage content for diversely expanding individual network service. Once collecting and increasing various theme covers 2 of various customized theme content, the service space content of the user will be diversely expanded into the customized network service corresponding to the theme content.

The present invention provides an actually practicable business benefit mode, wherein the present network service and existed technological module are used through innovative reintegration and a mechanism of substantial-product linkage, so as to build up a huge market business opportunity.

SUMMARY OF THE INVENTION

A primary object of the present invention is to provide a theme changeable mouse for automatically matching network communities, which comprises a substantial portion of a theme mouse 3 and a functional portion of auto-logging and matching communities 6.

To achieve the above object, the theme mouse 3 of the present invention comprises a mouse base 1 on a lower portion thereof and a theme cover 2 on an upper portion thereof for optionally changing theme model objects. The mouse base 1 is provided with an outer annual page-rolling roller 15 on an outer periphery thereof for replacing a small vertical roller of a front side of a traditional mouse, so as to provide a more ergonomic operation mode and a better operational controllability. Meanwhile, the outer annual page roller 15 can be easily controlled by a thumb or a little finger where only has fewest nerves of a hand, so as to be advantageous to decrease related hand diseases caused by operating a mouse.

The outer annual page roller 15 of the theme mouse 3 is engaged with and fastened on an annular seesaw key 14 which is provided with a pair of protruding shafts formed on two opposite sides thereof and pivoted on a lower plate 11, so that the annular seesaw key 14 can swing toward the other two sides thereof within a small angle range θ, just similar to a seesaw. Furthermore, each of the two swing sides is provided with a miniature key, respectively, i.e. a third key and a fourth key extended from the theme mouse 3, for immediately starting a customized cyberspace service.

The theme mouse 3 of the present invention uses a seamless network server to automatically register, login, and match the communities, wherein the theme cover 2 of the theme mouse 3 is built-in with a sub-ID. When the theme mouse 3 is installed on a terminal computer host 5 of a user, the theme mouse 3 automatically logs in an assigned web server 7 via a host driver-side program 4, so that the web server 7 will automatically start a corresponding service or match related community website space into a colony space according to an ID transmitted by the host driver-side program 4.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
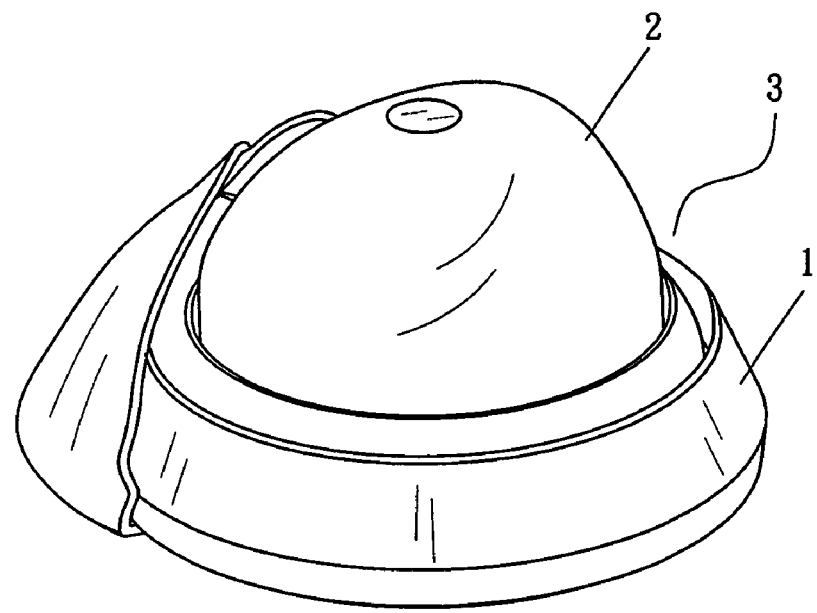
FIG. 1 is a perspective view of a theme changeable mouse for automatically matching network communities according to a preferred embodiment of the present invention.
Figure 2:
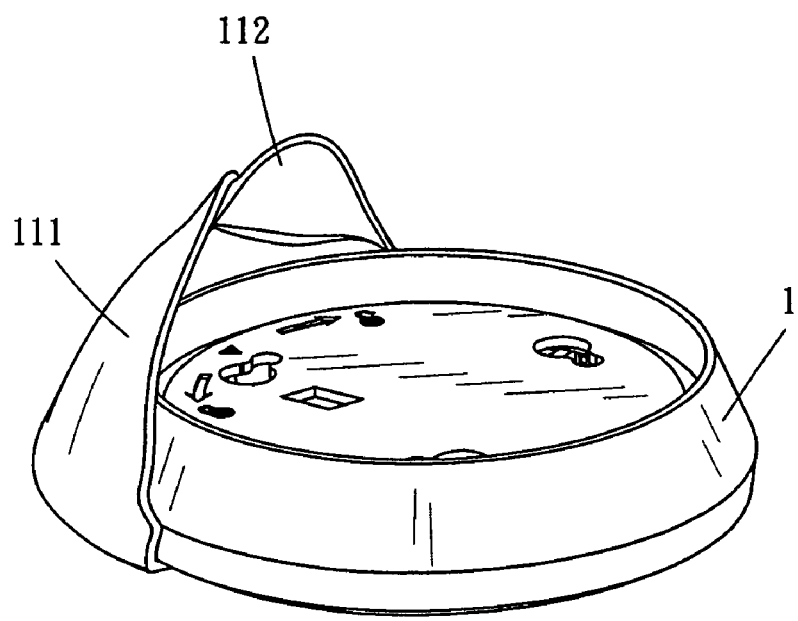
FIG. 2 is a perspective view of the theme changeable mouse for automatically matching network communities according to the preferred embodiment of the present invention, wherein a theme cover is removed therefrom.
Figure 3:
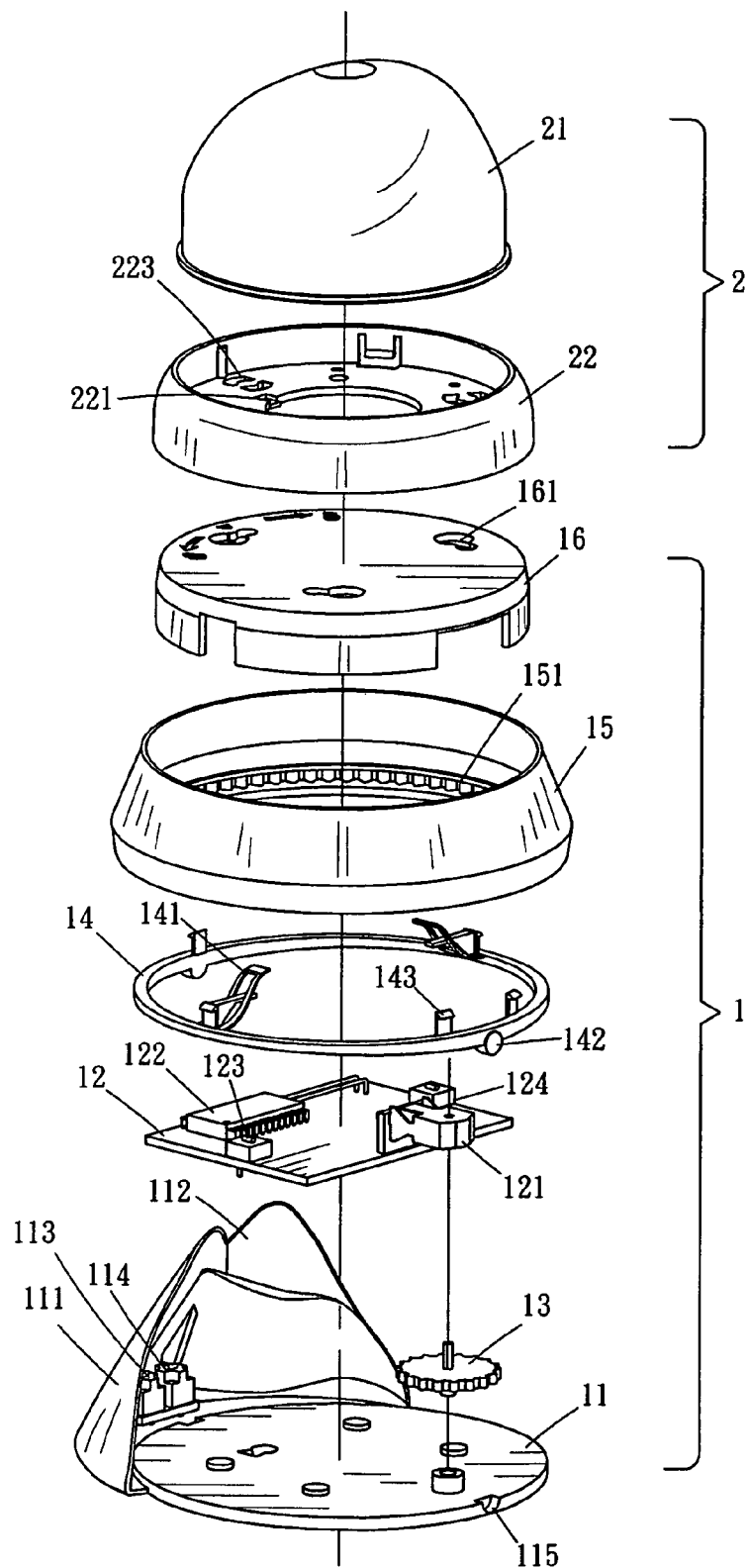
FIG. 3 is an exploded perspective view of the theme changeable mouse for automatically matching network communities according to the preferred embodiment of the present invention.

Referring now to FIGS. 1, 2, and 3, a theme changeable mouse for automatically matching network communities according to a preferred embodiment of the present invention is illustrated. As shown, a substantial mechanism of a theme mouse 3 comprises a mouse base 1 and a theme cover 2 which can be optionally installed with a changeable model object 21 thereon.

The mouse base 1 of the theme mouse 3 comprises a lower plate 11, a printed circuit board 12, a page-rolling transmission gear wheel 13, an annular seesaw key 14, an outer annular page-rolling roller 15, and a theme engaged cover 16. The theme cover 2 of the theme mouse 3 comprises the model object 21 having a crystal ball or a puppet of various styles and an engaged support plate 22. The model object 21 can be inserted into the engaged support plate 22 for mounting thereon, and each of the model object 21 is provided with a sub-ID storage circuit 221 on a bottom thereof.

Figure 13:
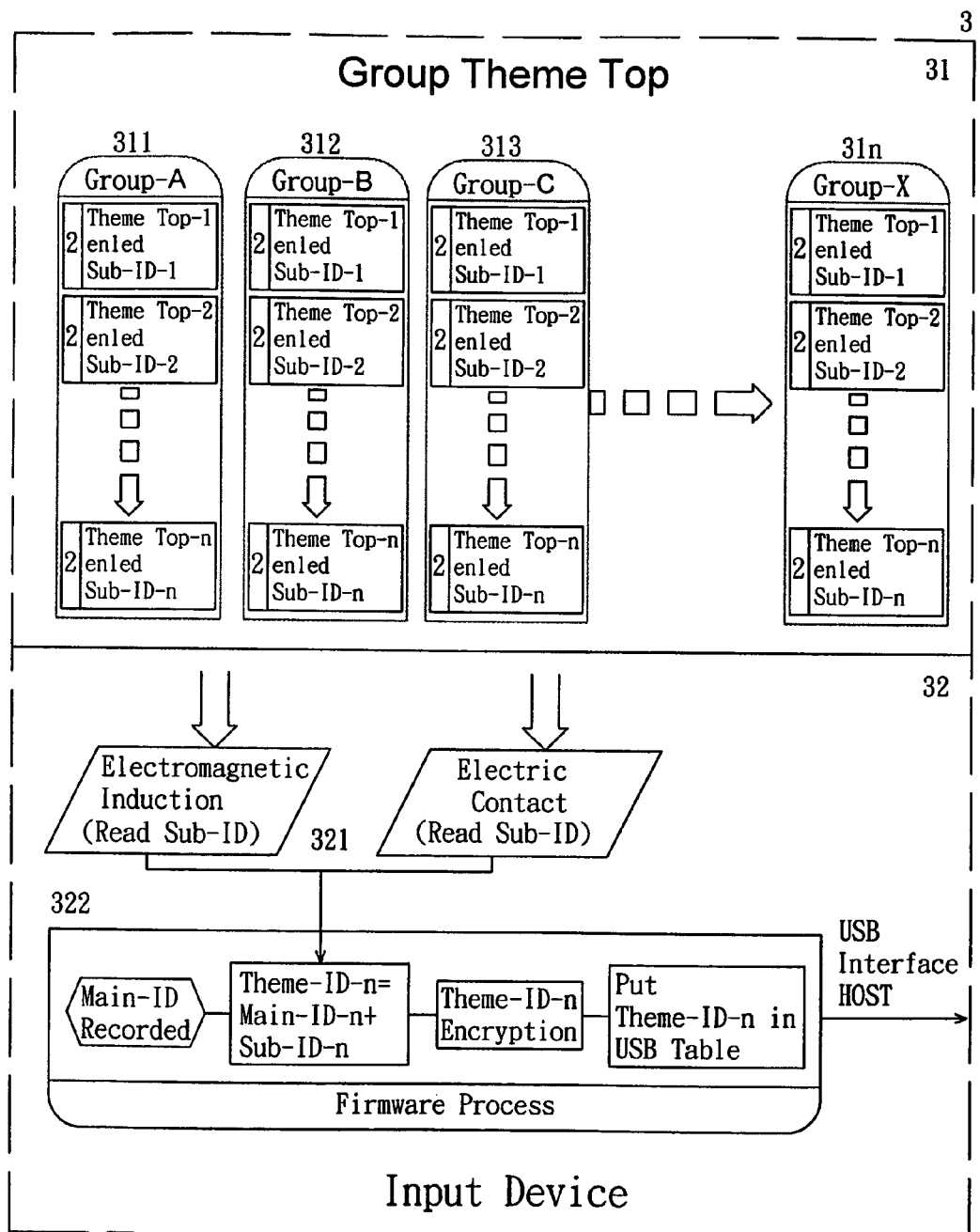
FIG. 13 is a functional block diagram of a mouse input end of the theme changeable mouse for automatically matching network communities according to the preferred embodiment of the present invention.

The printed circuit board 12 of the mouse base 1 comprises a control circuit firmware 32, as shown on FIG. 13. The control circuit firmware 32 is provided with a reading unit 321 and a recognition processing unit 322 therein for interactively executing a recognition interaction. The reading unit 321 can preferably be a detection and recognition procedure/module of electromagnetic induction or electric contact for reading out the sub-ID built in the theme cover 2 and transmitting it to the recognition processing unit 322. As a result, when the theme mouse 3 changes into various sub-IDs for automatically logging, the theme mouse 3 can provide more advanced information service.

The printed circuit board 12 and the page-rolling transmission gear wheel 13 are positioned on the lower plate 11 of the mouse base 1. A side of the lower plate 11 is extended to mount a left key 111 and a right key 112, which are aligned with a left micro switch 113 and a right micro switch 114 below, respectively. A suitable position of the lower plate 11 is mounted on a pair of bearing recesses 115. The printed circuit board 12 is provided with a page-rolling encryption switch 121 correspondingly transmitted by the page-rolling transmission gear wheel 13, an optical motion sensor 122, a third micro switch 123, and a fourth micro switch 124.

The annular seesaw key 14 is positioned on the lower plate 11 of the mouse base 1. A pair of opposite first portions of the annular seesaw key 14 are provided with a pair of elastic press blocks 141; a pair of opposite second portions thereof are provided with a pair of protruding shafts 142; and a plurality of third portions thereof are provided with a plurality of engaged hooks 143. After the printed circuit board 12, the page-rolling transmission gear wheel 13, and the annular seesaw key 14 are mounted on the lower plate 11 of the mouse base 1, the outer annular page-rolling roller 15 and the theme engaged cover 16 are further combined with the lower plate 11. The outer annular page-rolling roller 15 has an inner edge formed with a plurality of inner engaged teeth 151 which are corresponding to the page-rolling transmission gear wheel 13 and engaged therewith.

Figure 4:
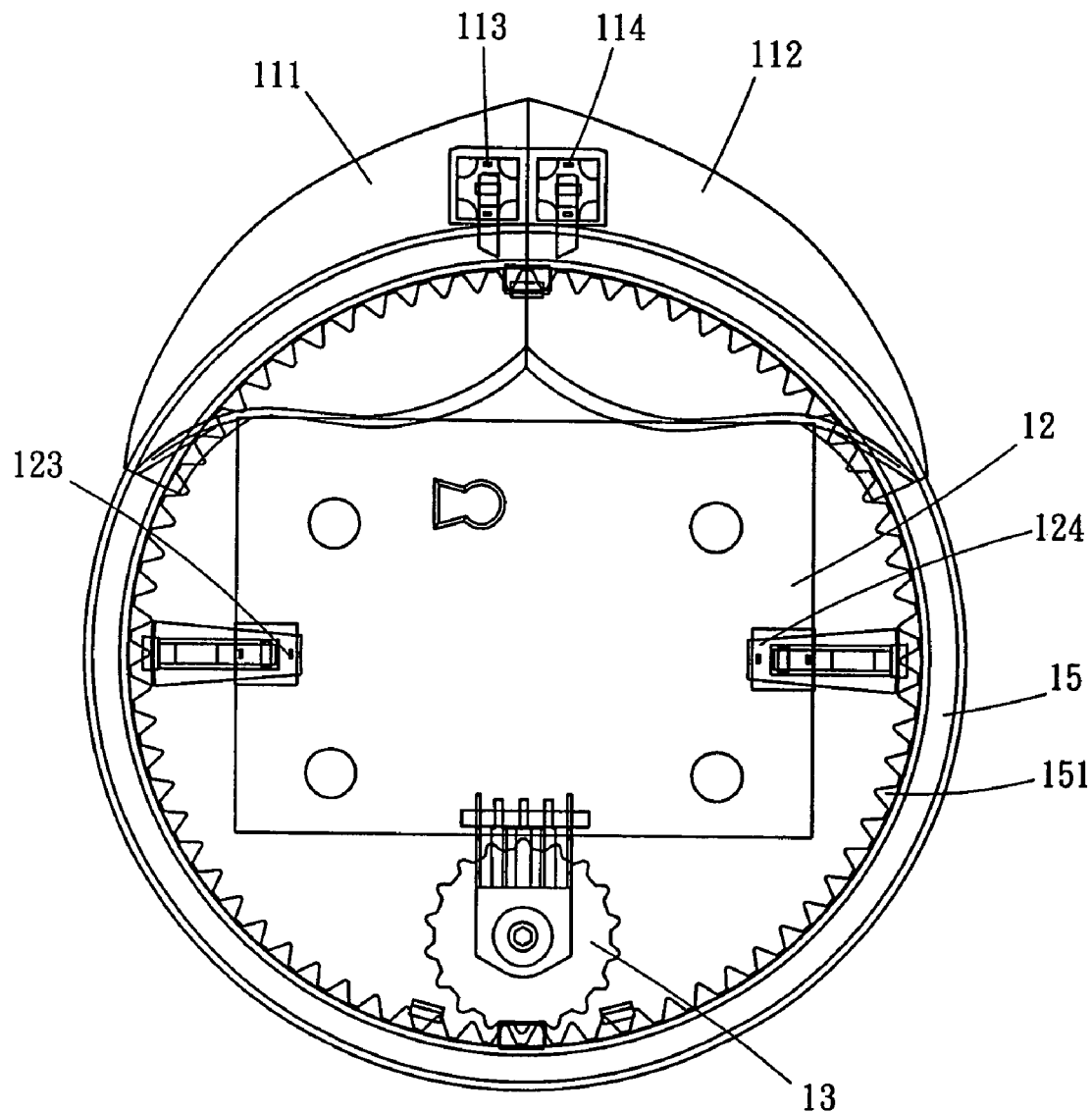
FIG. 4 is an upper view of a mouse base of the theme changeable mouse for automatically matching network communities according to the preferred embodiment of the present invention.
Figure 5:
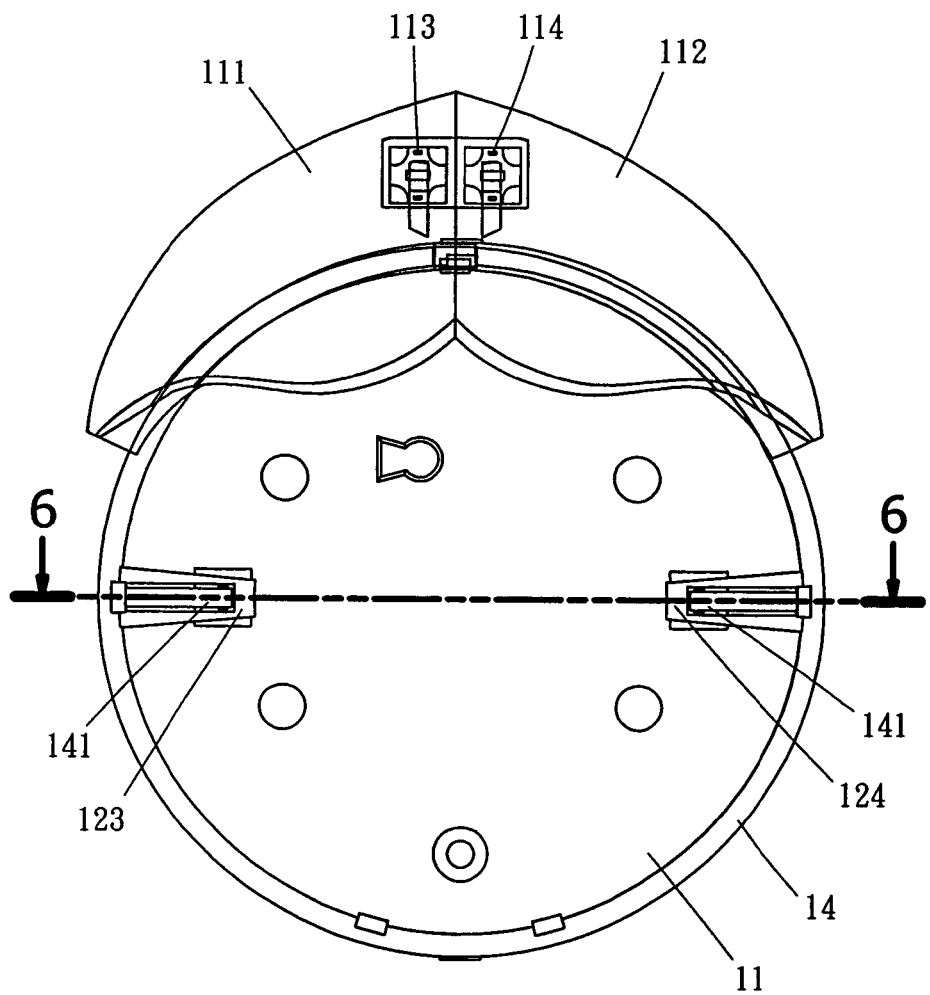
FIG. 5 is an assembled upper view of a lower plate and an annular seesaw key of the theme changeable mouse for automatically matching network communities according to the preferred embodiment of the present invention.
Figure 6:
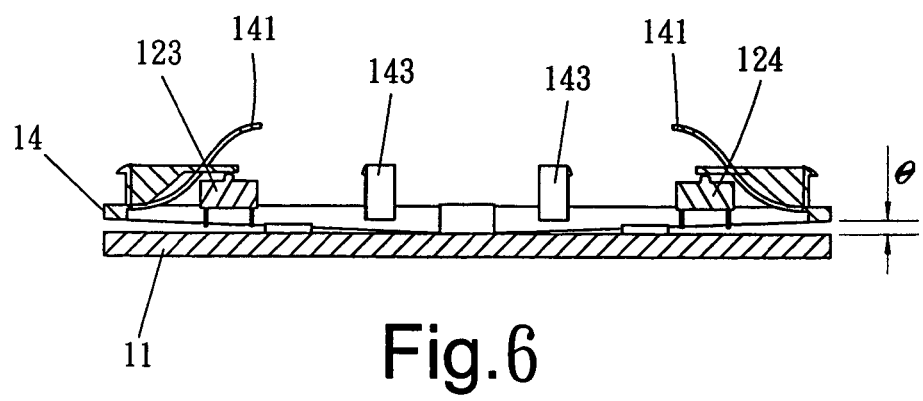
FIG. 6 is a cross-sectional view of the theme changeable mouse for automatically matching network communities according to the preferred embodiment of the present invention, taken along a line 6-6 in FIG. 5.

Referring now to FIGS. 4, 5, and 6, when rotating the outer annular page-rolling roller 15, the page-rolling encryption switch 121 can be driven to execute a horizontal page-rolling operation via the page-rolling transmission gear wheel 13. The engaged hooks 143 of the annular seesaw key 14 can engage with the outer annular page-rolling roller 15 which still can freely rotate in relation to the annular seesaw key 14. After combining the theme engaged cover 16, all components of the entire mouse base 1 will finish assembling.

Furthermore, according to a structural property of the annular seesaw key 14, the protruding shafts 142 thereof are pivotally received in the bearing recesses 115. As a result, the protruding shafts 142 can be an axis of the annular seesaw key 14, so that the annular seesaw key 14 can swing toward the elastic press blocks 141 on the two first portions within a swing angle range $\theta$ for providing a slightly pressing property. Moreover, the two elastic press blocks 141 can be in contact with the third micro switch 123 and the fourth micro switch 124 on the printed circuit board 12, respectively. Thus, when manually pressing one of the two opposite sides of the outer annular page-rolling roller 15, one of the third micro switch 123 and the fourth micro switch 124 will also be pressed.

In addition, the theme engaged cover 16 is provided with a plurality of reserved rotating engaged slots 161 thereon. Meanwhile, the engaged support plate 22 of the theme cover 2 is provided with a plurality of positioning rods 223 on a lower surface thereof. The positioning rods 223 can insert into the rotating engaged slots 161 and then rotate to engage therewith.

Figure 7:
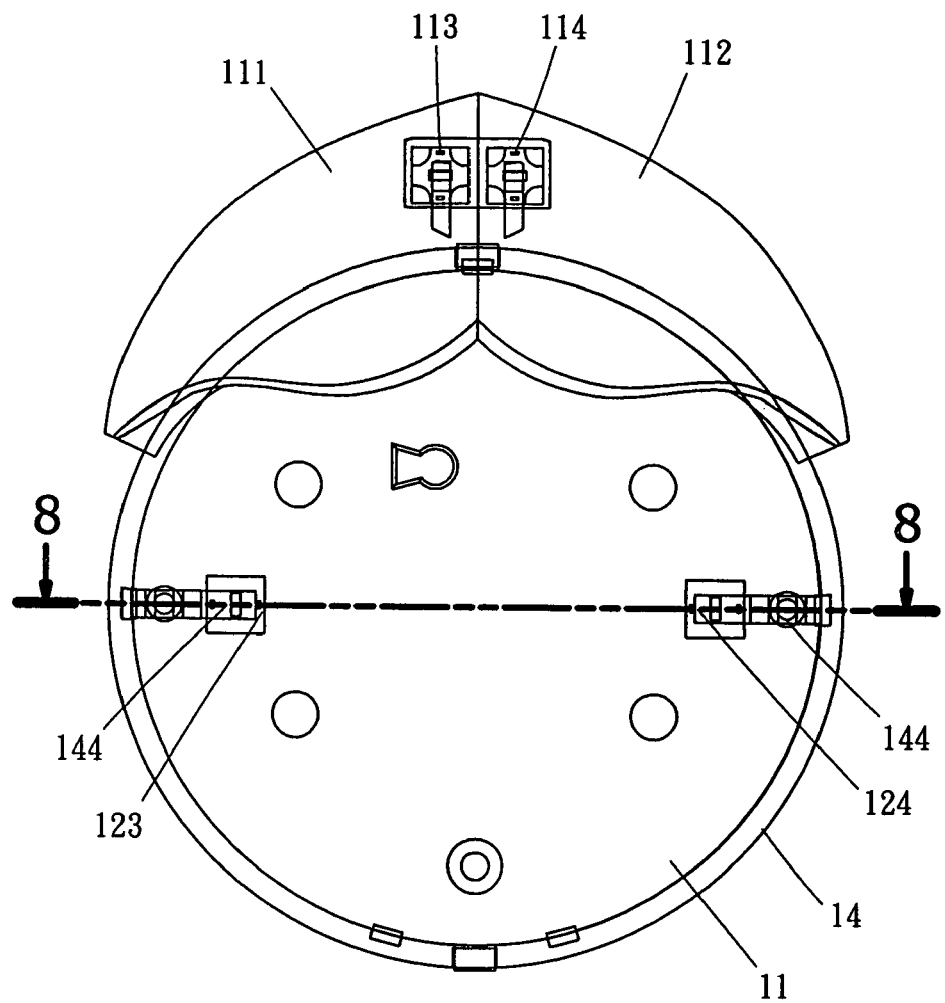
FIG. 7 is an assembled upper view of the theme changeable mouse for automatically matching network communities, which replaces the annular seesaw key by springs according to the preferred embodiment of the present invention.
Figure 8:
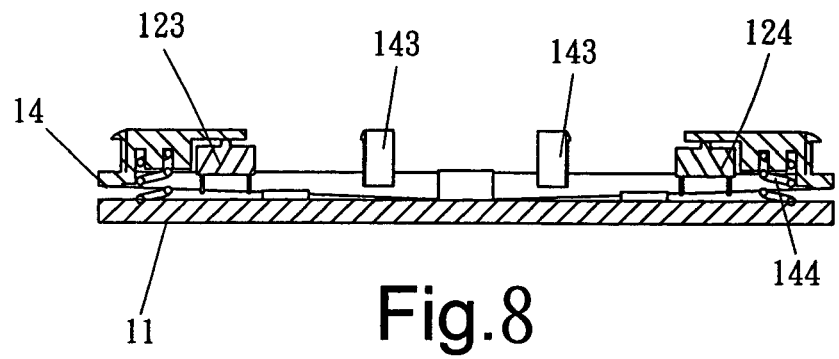
FIG. 8 is a cross-sectional view of the theme changeable mouse for automatically matching network communities according to the preferred embodiment of the present invention, taken along a line 8-8 in FIG. 7.
Figure 9:
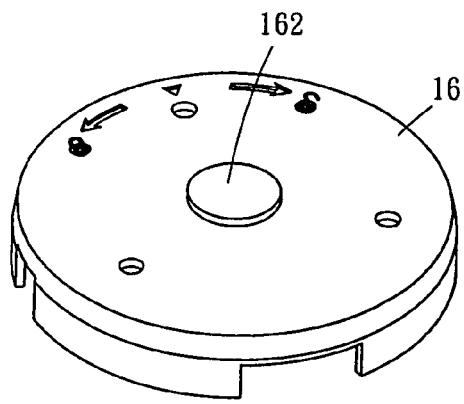
FIG. 9 is a perspective view of the theme changeable mouse for automatically matching network communities, which replaces an upper engaged cover by a magnet assembly according to the preferred embodiment of the present invention.
Figure 10:
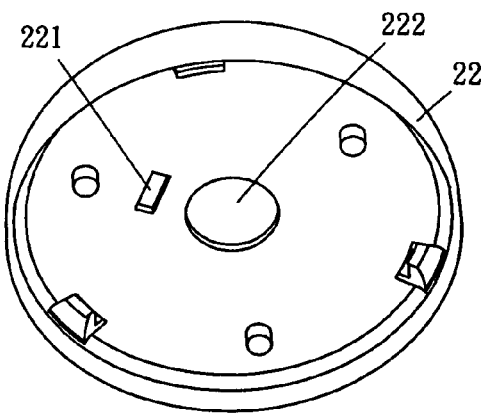
FIG. 10 is a perspective view of the theme changeable mouse for automatically matching network communities, which replaces an engaged support plate by a magnet assembly according to the preferred embodiment of the present invention.
Figure 11:
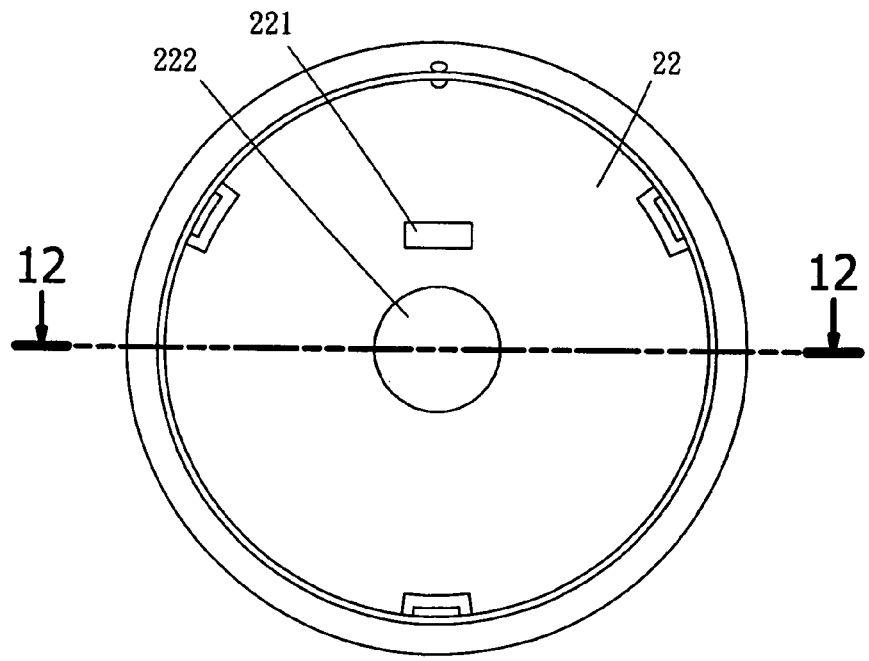
FIG. 11 is an upper view of the theme changeable mouse for automatically matching network communities, which replaces an upper engaged cover and an engaged support plate by a magnet assembly according to the preferred embodiment of the present invention.
Figure 12:
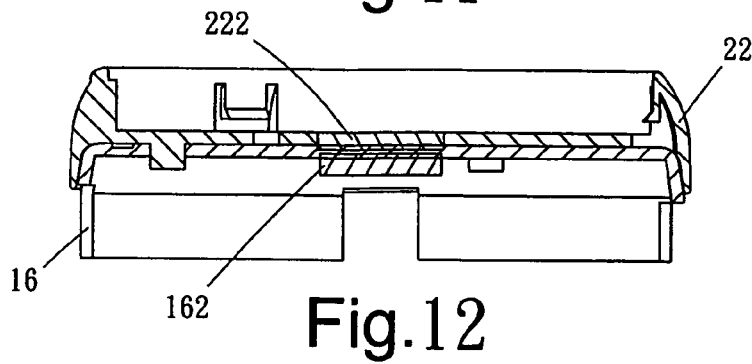
FIG. 12 is a cross-sectional view of the theme changeable mouse for automatically matching network communities, which replaces the upper engaged cover and the engaged support plate by the magnet assembly according to the preferred embodiment of the present invention, taken along a line 12-12 in FIG. 11.

Referring back to FIGS. 5 and 6, in the preferred embodiment of the present invention, the returning structure design of the annular seesaw key 14 for pressing the third micro switch 123 and the fourth micro switch 124 also can be replaced by an alternative preferred embodiment as shown in FIGS. 7 and 8. In the alternative preferred embodiment, the elastic press blocks 141 are replaced by a pair of springs 144 inserted between the annular seesaw key 14 and the lower plate 11, so as to provide the same returning function.

Referring now to FIGS. 9, 10, 11, and 12, the structure design of the rotating engaged slots 161 for installing or changing the theme model object 2 also can be replaced by another alternative preferred embodiment as shown in FIGS. 9 to 12. In the alternative preferred embodiment, the rotating engaged slots 161 are replaced by a pair of magnets 162,222 respectively mounted on the theme engaged cover 16 and the engaged support plate 22, wherein the two magnets 162,222 have opposite magnetic poles for attracting each other, so as to provide the same combining function.

Figure 14:
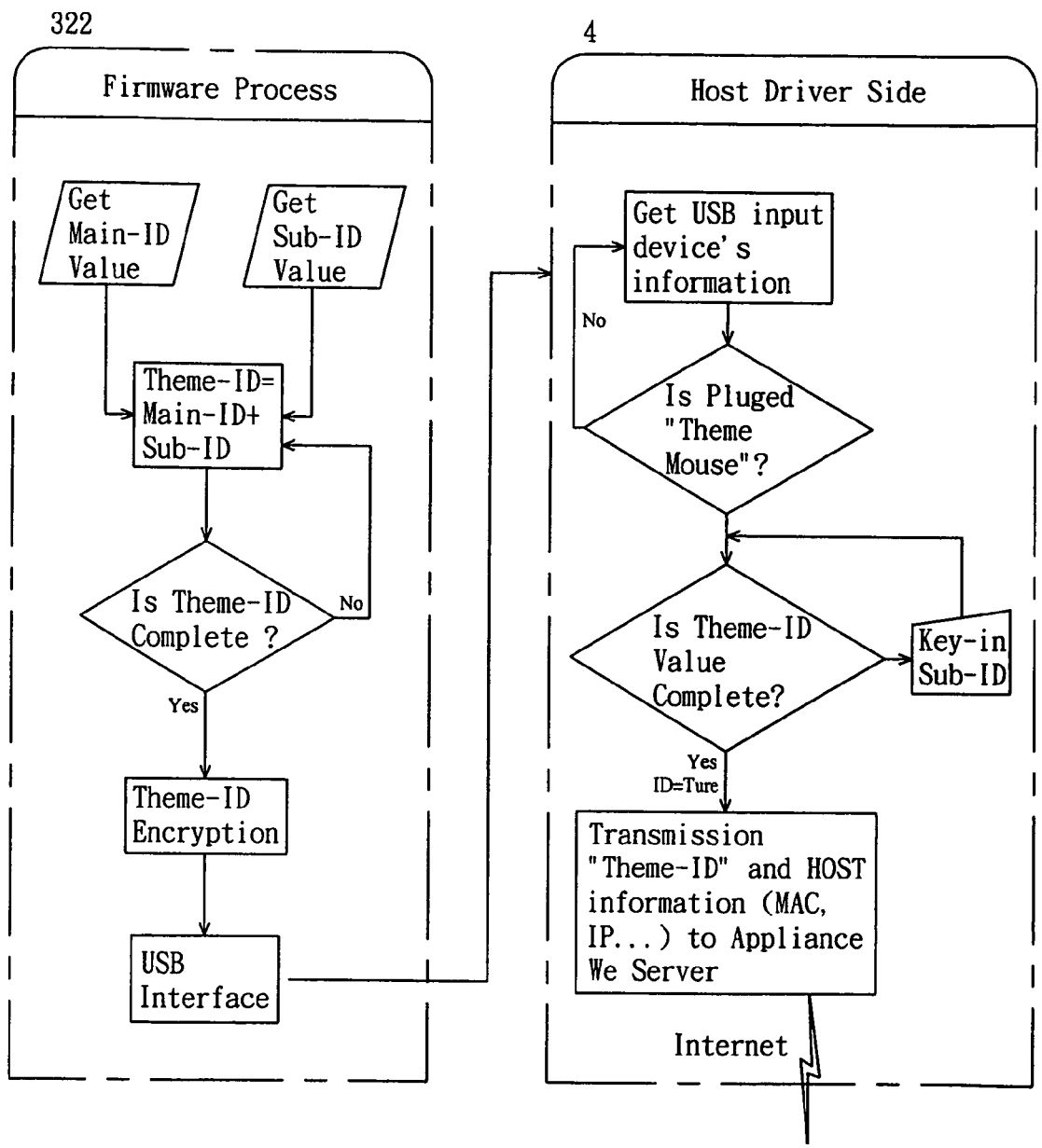
FIG. 14 is a functional block diagram of a recognition processing unit and a host driver-side program of the theme changeable mouse for automatically matching network communities according to the preferred embodiment of the present invention.

According to the present invention, the hardware structure of the theme mouse 3 of the theme changeable mouse for automatically matching network communities is described as above. The third micro switch 123 and the fourth micro switch 124 in contact with the annular seesaw key 14 can be used as specific function keys for immediately starting a customized cyberspace service. Referring now to FIGS. 13 and 14, in the preferred embodiment of the present invention, a functional portion of auto-logging and matching communities 6 comprises the control circuit firmware 32 and a host driver-side program 4, wherein the control circuit firmware 32 is mounted on the printed circuit board 12 of the mouse base 1 controlled by the user, while the host driver-side program 4 is installed in the terminal computer host 5 of the user. The sub-ID storage circuit 221 of the theme cover 2 of the theme mouse 3 is built-in with the sub-ID. After combining the sub-ID with a main-ID built in the control circuit firmware 32, a combination thereof is transmitted to the host driver-side program 4 in the terminal computer host 5 of the user, and then linked to an assigned web server 7 via the network. Then, after confirming an authorization based on a comparison with internal IDs filed in a server database, it will automatically register in the database for providing corresponding customized service content and space.

The functions of the present invention as described above is advantageous to exclude various procedures of traditionally applying for a network server space service (for ex., blog), such as applying, registering, password verifying, logging, authorizing, and providing service.

After this, when the theme mouse 3 having the customized ID (theme ID) is installed on a terminal computer, the web server 7 can actively verify the customized ID after a network linkage, and provide an accessible customized service and space based on the ID.

Referring still to FIG. 13, in the preferred embodiment of the present invention, the theme mouse 3 comprises a theme cover group 31 and the control circuit firmware 32, wherein the theme cover group 31 is installed in the theme cover 2 and has the content of the changeable model object 21 of the sub-ID, while the control circuit firmware 32 is installed in the printed circuit board 12 of the mouse base 1.

The theme cover group 31 comprises a plurality of groups, i.e. a group A 311, a group B 312, a group C 313, ... and up to a group X 31n, wherein each of the groups has a set of sub-IDs including a sub-ID-1, ... and up to a sub-ID-n. The control circuit firmware 32 comprises the reading unit 321 and the recognition processing unit 322, wherein the reading unit 321 can read the sub-ID, while the recognition processing unit 322 can combine the main-ID with the sub-ID.

The recognition processing unit 322 can execute procedures of recording the main-ID, combining the main-ID with the sub-ID (i.e. Theme-ID-n=Main-ID-n+Sub-ID-n), encrypting the Theme-ID-n, and putting the Theme-ID-n into an USB table. After finishing all of the procedures, the information will be transmitted to the host driver-side program 4 in the terminal computer host 5 of the user via an USB interface.

Referring now to a right block of FIG. 14, the host driver-side program 4 can execute procedures of determining if a user terminal input interface is the theme mouse 3, checking if the theme-ID is complete, comparing with a theme-ID previously filed in an internal database of the assigned web server 7 via the network, and authorizing after confirming the comparison.

Figure 15:
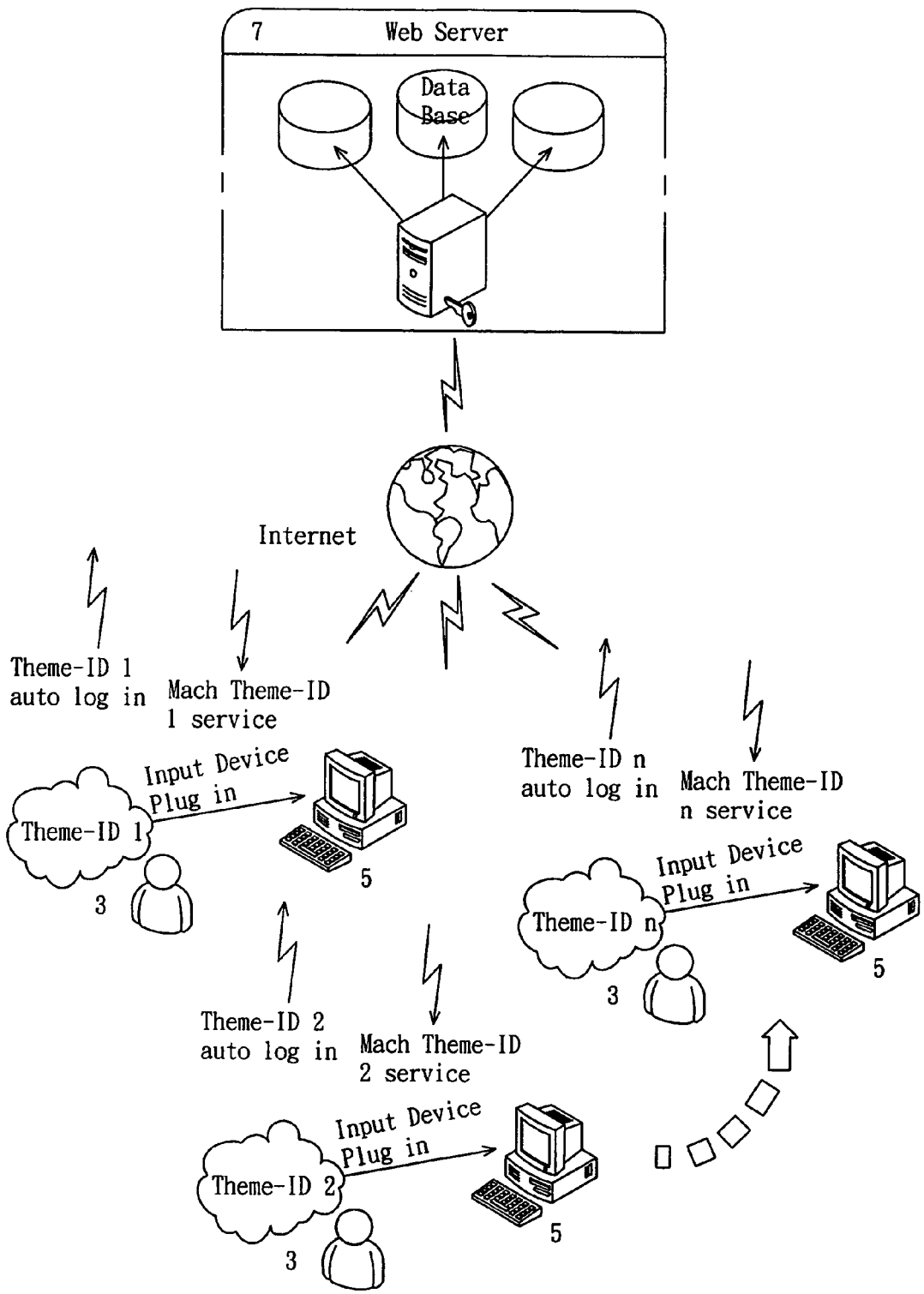
FIG. 15 is a schematic view of a user end and a customized website of the theme changeable mouse for automatically matching network communities according to the preferred embodiment of the present invention.

Referring now to FIG. 15, the terminal computer host 5 of the user, which logs in from a remote end, will transmit related host information, such as the theme-ID, a Media Access Control (MAC) value, an Internet Protocol (IP) value, and other status values, to the assigned web server 7, in order to automatically register, log in, match users of common communities, and further provide or start corresponding content and space of customized related service.

Figure 16:
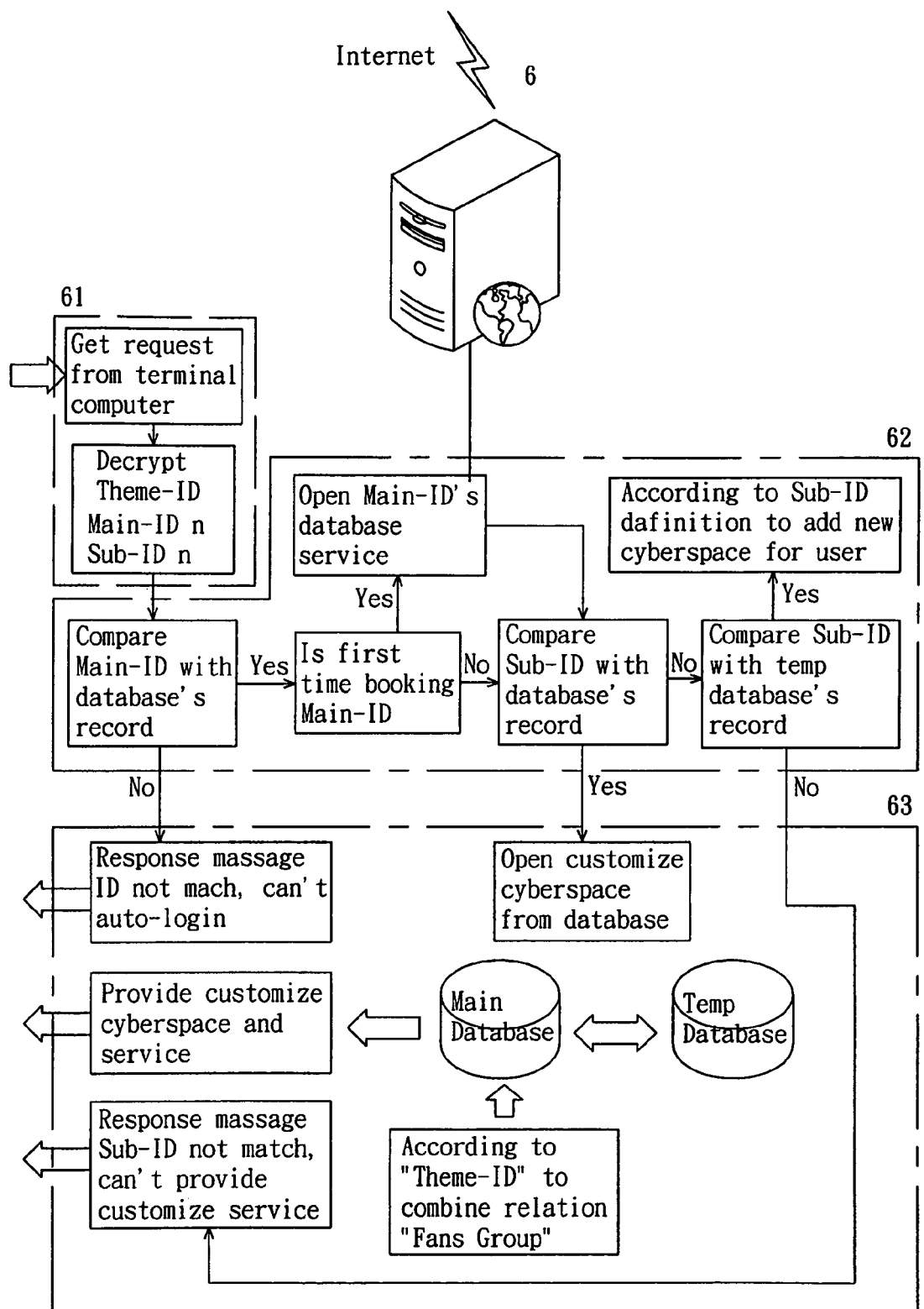
FIG. 16 is a functional block flowchart of a community matching procedure of the theme changeable mouse for automatically matching network communities according to the preferred embodiment of the present invention.

Referring now to FIG. 16, a functional block flowchart of a community matching procedure of the theme changeable mouse for automatically matching network communities according to the preferred embodiment of the present invention is illustrated. As shown, the functional portion of auto-logging and matching communities 6 comprises an information processing module 61, an auto-registering/logging module 62, and a database service and matching module 63.

When the web server 7 receives a service request from the remote terminal computer host 5, the information processing module 61 can decrypt obtained related information into the theme-ID which is then transmitted to the auto-registering/logging module 62. The auto-registering/logging module 62 can further determine if the theme-ID is a legal theme-ID, a new registering member, a cyberspace need of new theme content, a general network auto-logging, and/or other functions.

The corresponding procedures executed by the auto-registering/logging module 62 are further sent to the database service and matching module 63 for executing further corresponding procedures, such as opening a customized network service content and cyberspace of matched fans group, adding a new theme content and cyberspace, responding a failure of logging cyberspace service, or other functions, each of which will be responded to the remote terminal computer host 5, so as to automatically open the corresponding service or match for entering a specific community website.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A theme changeable mouse for automatically matching network communities, comprising a substantial portion of a theme mouse 3 and a functional portion of auto-logging and matching communities 6, wherein:

the substantial portion of the theme mouse 3 comprises a mouse base 1 and a theme cover 2 which can be installed with a changeable model object 21 thereon; the mouse base 1 comprises a lower plate 11, a printed circuit board 12, a control circuit firmware 32 on the printed circuit board 12, a page-rolling transmission gear wheel 13, an annular seesaw key 14, an outer annular page-rolling roller 15, and a theme engaged cover 16; the theme cover 2 comprises the model object 21 having a crystal ball or a puppet of various styles and an engaged support plate 22; the model object 21 can be inserted into the engaged support plate 22 for mounting thereon; each of the model object 21 is provided with a sub-ID storage circuit 221 on a bottom thereof; the printed circuit board 12 of the mouse base 1 comprises a control circuit firmware 32 which is provided with a reading unit 321 and a recognition processing unit 322 therein for mutually executing a recognition interaction; the reading unit 321 is a detection and recognition module of electromagnetic induction or electric contact for reading out a sub-ID built in the theme cover 2 and transmitting it to the recognition processing unit 322, so that the theme mouse 3 can provide more advanced information service, when the theme mouse 3 changes into various sub-IDs for automatically logging; and the functional portion of auto-logging and matching communities 6 comprises an information processing module 61, an auto-registering/logging module 62, and a database service and matching module 63; when the web server 7 receives a service request from a remote terminal computer host 5, the information processing module 61 can decrypt obtained related information into a theme-ID which is then transmitted to the auto-registering/logging module 62; the auto-registering/logging module 62 can further determine if the theme-ID is a legal theme-ID, a new registering member, a cyberspace need of new theme content, or a general network auto-logging; corresponding procedures executed by the auto-registering/logging module 62 are further sent to the database service and matching module 63 for executing further corresponding procedures including opening a customized network service content and cyberspace of matched fans group, adding a new theme content and cyberspace, or responding a failure of logging cyberspace service, each of which is responded to the remote terminal computer host 5, so as to automatically open the corresponding service or match for entering a specific community website.

2. The theme changeable mouse for automatically matching network communities of claim 1, wherein the theme cover 2 is changeable, and the built-in sub-ID thereof is combined with a main-ID of the mouse base 1 to form a customized theme-ID (recognition ID); and wherein the theme mouse 3 can automatically log in a web server 7 to further provide a customized group matching and an accessible service and space based on the customized theme-ID, when the theme mouse 3 having the customized theme ID is installed on a terminal computer.

3. The theme changeable mouse for automatically matching network communities of claim 2, wherein the theme engaged cover 16 of the mouse base 1 further comprises a plurality of reserved rotating engaged slots 161 thereon; the engaged support plate 22 of the changeable theme cover 2 further comprises a plurality of positioning rods 223 on a lower surface; and the positioning rods 223 can insert into the rotating engaged slots 161 and rotate to engage therewith.

4. The theme changeable mouse for automatically matching network communities of claim 3, wherein the combination structure of the mouse base 1 and the theme cover 2 of the substantial portion of the theme mouse 3 is a pair of magnets 162,222 respectively mounted on the theme engaged cover 16 of the mouse base 1 and the engaged support plate 22 of the theme cover 2, and wherein the two magnets 162,222 have opposite magnetic poles attracting each other.

5. The theme changeable mouse for automatically matching network communities of claim 1, wherein the printed circuit board 12 and the page-rolling transmission gear wheel 13 are positioned on the lower plate 11 of the substantial portion; the printed circuit board 12 is provided with a page-rolling encryption switch 121 corresponding to the outer annular page-rolling roller 15 which has an inner edge formed with a plurality of inner engaged teeth 151, so that the page-rolling encryption switch 121 can be driven to execute a horizontal page-rolling operation when the outer annular page-rolling roller 15 is rotated.

6. The theme changeable mouse for automatically matching network communities of claim 1, wherein the printed circuit board 12 of the substantial portion of the theme mouse 3 is provided with a third micro switch 123 and a fourth micro switch 124 corresponding to a pair of elastic press blocks 141 or springs 144 of the annular seesaw key 14, so that one of the third micro switch 123 and the fourth micro switch 124 can be pressed when pressing one of two opposite sides of the outer annular page-rolling roller 15.

\* \* \* \* \*